Feb. 14, 1961   M. C. WINSKI   2,971,795
COIL HAULING VEHICLE
Filed March 21, 1960   3 Sheets-Sheet 1
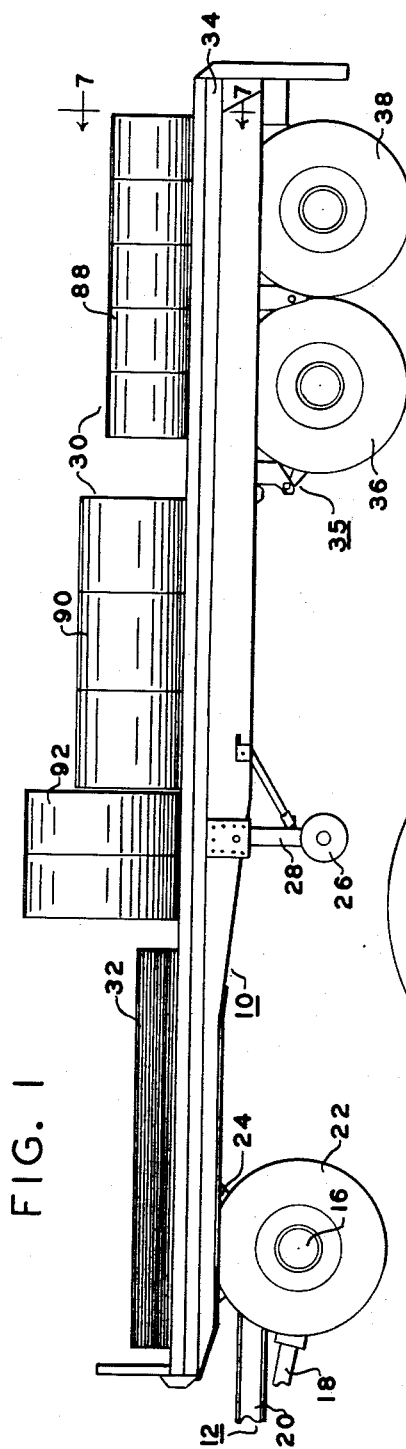
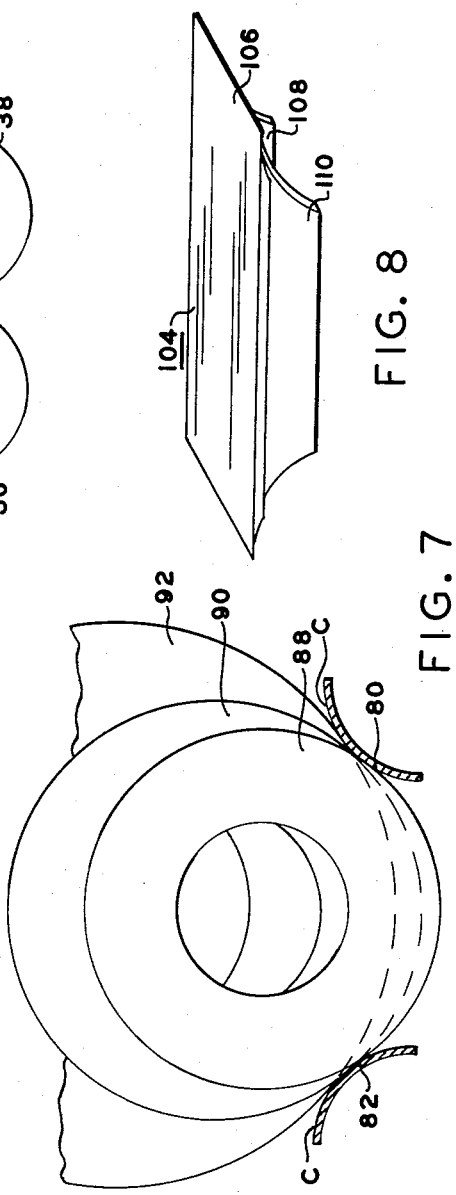
INVENTOR.
MORTIMER C. WINSKI
BY M. A. Hobbs
ATTORNEY Feb. 14, 1961   M. C. WINSKI   2,971,795
COIL HAULING VEHICLE
Filed March 21, 1960   3 Sheets-Sheet 2

INVENTOR.
MORTIMER C. WINSKI
BY
ATTORNEY

Feb. 14, 1961 M. C. WINSKI 2,971,795
COIL HAULING VEHICLE
Filed March 21, 1960 3 Sheets-Sheet 3

INVENTOR.
MORTIMER C. WINSKI
BY
ATTORNEY

United States Patent Office 2,971,795
Patented Feb. 14, 1961

2,971,795
COIL HAULING VEHICLE
Mortimer C. Winski, 2nd and Dyson Sts.,
Michigan City, Ind.
Filed Mar. 21, 1960, Ser. No. 16,604
2 Claims. (Cl. 296—28)

The present invention relates to trailers and more particularly to trailers and similar vehicles for hauling coils of strip steel and the like.

In the conventional method of transporting steel coils on highways and streets from the steel mills to steel fabricators, the coils are placed on a trailer bed in end-to-end position and held on the trailer by placing wood timbers along each side of the coils on the trailer floor and securing the coils in position with a number of large chains extending over the tops of the coils and fastened at their ends to side rails or the trailer frame. This method of securing the coils onto the trailer is not only laborious and time consuming, but also requires frequent replacement of the timbers from one load to another and is not a consistently reliable means of retaining the coils on the trailer. Other methods, including the use of trailers having a longitudinal channel in the center of the bed, have been tried but this latter type has had the inherent disadvantage that the trailer either will not safely haul different sized coils, or the coils are damaged by the supporting structure on which the coils are placed. The use of timbers in the channel type trailer to protect the coils has likewise required frequent replacement of the timbers involving substantial costs both of labor and material. It is therefore one of the principal objects of the present invention to provide a trailer or similar vehicle which can haul steel coils of various sizes without adjustments or alterations in the vehicle structure being required, and which will not damage the coils or require replacement of the coil supporting structure.

Another object of the invention is to provide a coil hauling vehicle on which the coils can be easily loaded and secured in place with a minimum amount of equipment and which will effectively retain the coils in place on the bed without the securing means while the vehicle is being loaded and during normal travel of the trailer on the highway and streets.

Still another object of the invention is to provide an apparatus for hauling, handling and storing coils of steel strip material, having a longitudinal channel for receiving and holding the coils in end-to-end position and providing a pair of spaced coil support structures which are so designed and arranged that the coils, regardless of variations in diameter over a wide range, rest on the same type of smooth rounded surfaces.

Another object is to provide a vehicle of the aforesaid type which can be used satisfactorily to haul either coils or flat sheets or slabs, or to haul both coils and the sheets and slabs at the same time.

A further object of the invention is to provide a vehicle of the aforesaid type which is simple in construction and design and which can be easily maintained in service with a minimum amount of repairs and attention.

Additional objects and advantages of the present invention will become apparent from the following description and accompanying drawings, wherein:

Figure 1 is a side elevational view of a semi-trailer with the present invention incorporated therein, shown connected to a tractor and having mounted thereon a number of steel coils and flat steel sheets;

Figure 7 is a schematic vertical cross sectional view taken on line 7—7 of Figure 1, illustrating the manner in which the present vehicle adapts itself to coils of various sizes; and Figure 8 is a perspective view of an insert for use in adapting the vehicle for hauling flat sheets and slabs.

Figure 2:
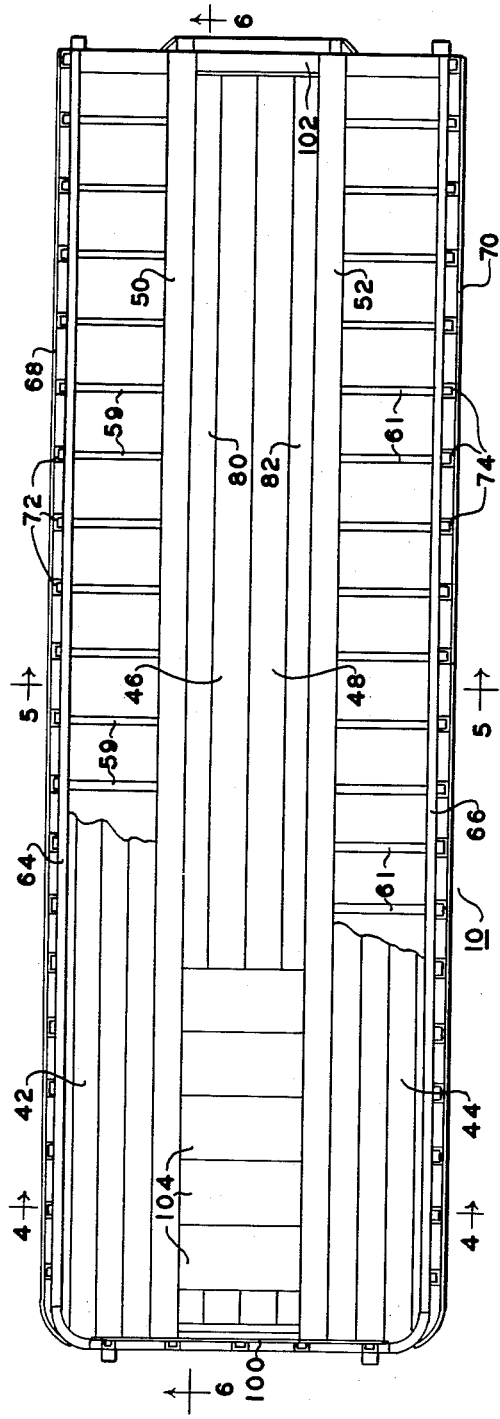
Figure 2 is a top plan view of the trailer shown in Figure 1 with a portion of the floor broken away to show the frame construction.
Figure 3:
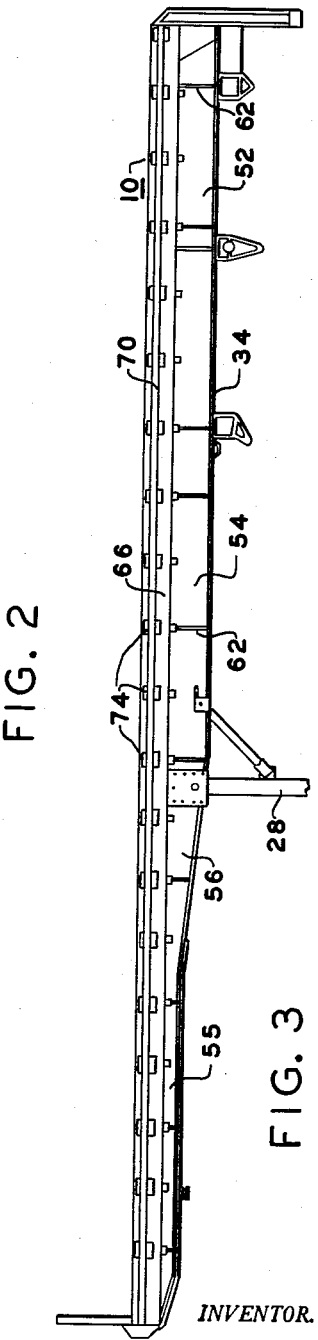
Figure 3 is another side elevational view of the trailer showing certain features thereof in greater detail.
Figure 4:
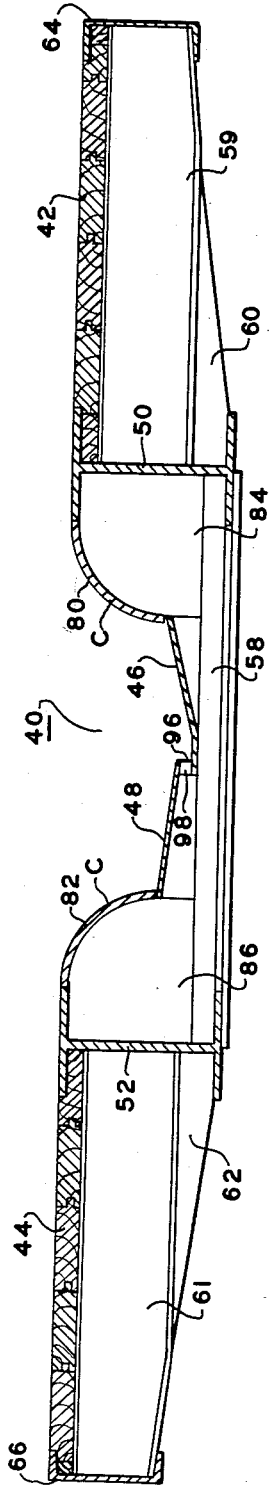
Figure 4 is an enlarged transverse vertical cross sectional view of the present trailer taken on line 4—4 of Figure 2.
Figure 5:
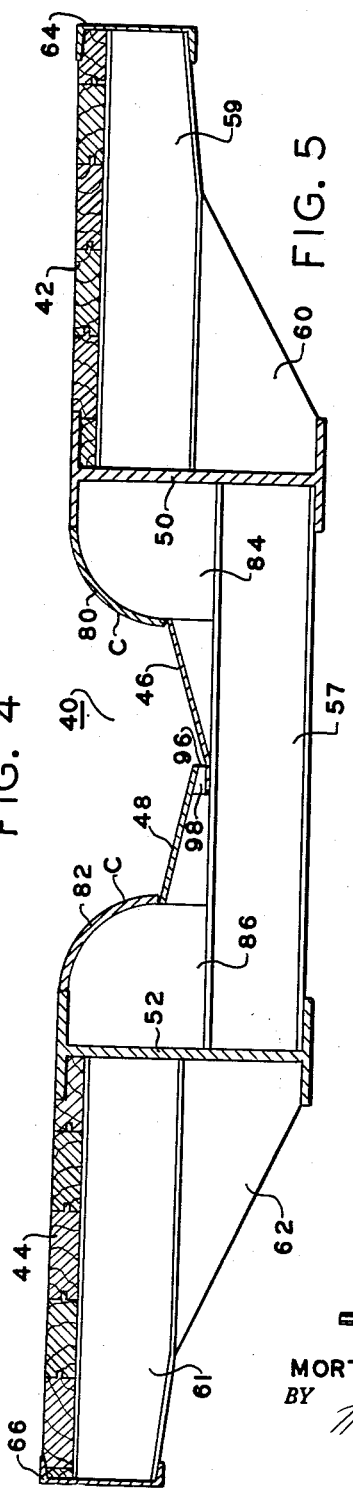
Figure 5 is an enlarged transverse vertical cross sectional view of the trailer taken on line 5—5 of Figure 2.
Figure 6:
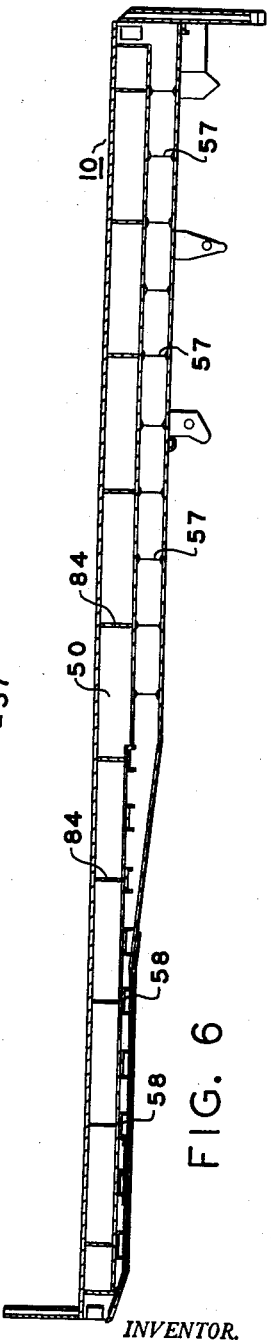
Figure 6 is a longitudinal vertical cross sectional view of the trailer taken on line 6—6 of Figure 2.

Referring more specifically to the drawings, number 10 designates generally the semi-trailer, 12 a tractor for pulling the trailer, including a rear axle 16, a drive shaft 18, frame 20 and rear wheels 22, numeral 24 indicating the fifth wheel supporting the front end of trailer 10. The tractor and undercarriage of the trailer may for the purpose of the present description be considered as conventional and will not be described in detail herein. The trailer can be unhitched from the tractor and the front end thereof supported by parking wheels and frame, 26 and 28, respectively, for loading and unloading the trailer. In Figure 1 the trailer is shown loaded with both coils 30 of steel strip material and flat sheet steel or slabs 32, the trailer being adapted to hauling either all coils or sheet and/or slabs, or hauling a combination of these products in a single load.

The trailer consists of a body structure 34 supported on an undercarriage 35 including tandem axles and wheels 36 and 38 and a longitudinal channel 40 in the center of the trailer body, flooring 42 and 44 on the right and left sides of the trailer, and splash pans 46 and 48 in the bottom of channel 40. The frame structure must be constructed to support heavy loads of coil, flat sheet and/or slab material, and consists of longitudinal I-beams 50 and 52 extending the full length of the trailer body and having a wide portion 54 above the wheels, a narrow portion 55 above the tractor, and a connecting tapered portion 56. The two beams are spaced apart sufficiently to permit channel 40 to extend downwardly therebetween and are connected rigidly together by a series of cross I-beam members 57 along wide portion 54 and by a series of inverted channel iron members 58 along the narrow and tapered portions. The cross members rest on the internal lower flange of the I-beams and are preferably joined to the longitudinal beams by welding the ends of the cross members to the flanges and the vertical plates of the beams. Flooring sections 42 and 44 are supported by a series of outriggers 59 and 61, respectively, on the right and left sides of the trailer, the outriggers being welded to the external surface of the longitudinal I-beams and supported by outwardly and upwardly tapered braces 60 and 62 supported by and welded to the lower external flanges of the beams and welded to the underside of the outriggers. Inwardly facing channel iron members 64 and 66 are secured to the outer ends of the outriggers, and the flooring, which preferably consists of thick wooden timbers, is secured to the upper side of the outriggers by bolts or lag screws (not shown). Secured to the external surface of members 64 and 66 are rails 68 and 70 held in spaced relation to members 64 and 66 by a series of spaced lugs 72 and 74 on the right and left sides of the trailer. The rails with the spacing lugs provide firm and convenient anchoring points for the chains used to tie the coils and sheet material in place on the trailer.

Channel 40 is formed between longitudinal I-beams 50 and 52 in the center of the body by longitudinal coil support members 80 and 82 extending the full length of the channel and supported on cross members 57 by plates 84 and 86, the lower edge of which rests on the cross members and the outwardly facing vertical edge being joined preferably by welding to the adjacent side of the respective I-beam. One of the important features of the present invention is the transverse curvature C of the two members 80 and 82 which provides an upwardly and inwardly facing convex surface extending approximately ninety degrees from the horizontal plane to the vertical plane. This curvature which is of a relatively large radius, presents a smooth surface for the steel coils over a wide range of diameters, as illustrated diagrammatically in Figure 7, in which three different sized coils 88, 90 and 92 are shown in full lines resting on the two support members. Normally for satisfactory performance of the present apparatus, the curvature of surfaces C has a radius greater than approximately four inches, and it may be of an irregular curvature rather than a segment of a single circle as shown. A surface with a radius of less than about four inches will normally cause indentations and other damage to the outer convolution of the coils.

While plates 84 and 86 are rather closely spaced along the support members, one on each side normally being disposed beneath each coil on the trailer, the support members are necessarily relatively thick to provide sufficient strength to distribute the weight of the coils substantially evenly over most or several of the opposed plates 84 and 86. The two support members 80 and 82 are preferably constructed of steel; however, other materials may be used, such as plastic or plastic coated steel.

The bottom of the channel is partially closed by splash pans 46 and 48, consisting of inwardly sloping panels extending toward the center and downwardly to drain water from rain and snow falling on the trailer and coils through a longitudinal space 96, the space being formed by the overlapping and spaced relationship between the panels held in the spaced position by a series of spacer members 98. Pans 46 and 48 prevent road slush and dirt from reaching the coils, while at the same time permitting water and dirt falling into the channel to readily and effectively drain or fall from the channel through opening 96. A single panel sloping downwardly toward the center and having drain holes therethrough at the bottom may be used in place of the two panel construction shown in the drawings. The front end of the channel is closed by wall member 100 extending across the front of the body and preferably projecting upwardly above the upper surface of the trailer body, and the rear end is closed by a rear end plate 102 extending completely across the back of the body and being flush with the upper surface of the body.

A perspective view of one of the inserts 104 which convert the unit to a flat bedded vehicle for hauling small and miscellaneous parts and materials, is shown in Figure 8, the insert consisting of a flat piece 106 forming the cover for the channel and support for the material, and two brackets 108 and 110 secured to the underside of plate 106 and extending downwardly into the channel. The two brackets extend across the channel and the two ends thereof are curved to correspond to the curvature of the coil support members 80 and 82. The inserts can be readily placed across the channel covering part or all of the channel, depending on the type of materials and size of the load to be hauled.

In using the present trailer for hauling coils of steel strip, the coils are placed end-to-end in channel 40 with the sides of the coils resting on the smooth convex surfaces of support members 80 and 82. The coils will remain in this position without any additional securing means being employed; however, as a precaution to avoid accidental displacement of the coil load, it is usually desirable to secure the coils in place in the channel. The preferred method of securing the coils consists in looping a pair of chains through the holes in the center of coils and attaching the ends of one chain to rail 68 and the ends of the other chain to rail 70. Another method consists in placing timbers in end-to-end position through the center opening of the coils and tying the timbers with two or more chains extending across the top of the timbers and being securely attached to side rails 68 and 70. Support members 80 and 82 form permanent side supports for the coils which will not damage the coils regardless of their diameter and which will last for the life of the trailer.

The structure forming the channel having the spaced, longitudinal support members 80 and 82 with the upwardly and inwardly facing convex surfaces for receiving the coils may be used in other types of vehicles besides trailers, such as railroad cars and trucks, and the structure including members 80 and 82 can be constructed separately and used apart from the vehicle or used as a removable structure on any flat bedded vehicles. Various other changes and modifications may be made in the coil hauling support and vehicle without departing from the scope of the present invention.

I claim:

1. A trailer for hauling coils of steel strip material, comprising two spaced parallel I-beams, a plurality of cross members between the lower portion of said beams, outriggers secured to the outside of said beams, flooring on said outriggers, parallel members between said beams in spaced relation forming a channel extending longitudinally substantially the full length of said trailer, each of said members having an upwardly and inwardly facing convex surface for receiving and supporting coils in end-to-end position, the curvature of said surface having a radius greater than approximately four inches, plate-like vertical members supported by said cross members and connected to said beams for supporting said coil receiving members, a pair of inwardly and downwardly extending panels forming the bottom of said channel and being spaced from one another in the vertical direction at the center of the channel to form a drain opening for the channel, and a plurality of inserts, each insert having a plate extending across said channel forming a cover therefor.

2. A trailer for hauling coils of steel strip material, comprising two spaced parallel I-beams, a plurality of cross members between the lower portion of said beams, outriggers secured to the outside of said beams, flooring on said outriggers, parallel members between said beams in spaced relation forming a channel extending longitudinally substantially the full length of said trailer, each of said members having an upwardly and inwardly facing convex surface for receiving and supporting coils in end-to-end position, the curvature of said surface having a radius greater than approximately four inches, members supported by said cross members for supporting said coil receiving members, a pair of inwardly and downwardly extending panels forming the bottom of said channel and having an opening near the point of juncture forming a drain opening for the channel, and an insert having a plate extending across said channel forming a cover therefor.

References Cited in the file of this patent

UNITED STATES PATENTS

| | | |
|---|---|---|
| 2,622,918 | Staffe | Dec. 23, 1952 |
| 2,873,692 | Schey et al. | Feb. 17, 1959 |